US011737158B2

(12) United States Patent
Sokolov et al.

(10) Patent No.: US 11,737,158 B2
(45) Date of Patent: Aug. 22, 2023

(54) TRUE WIRELESS STEREO SYSTEM AND METHOD

(71) Applicant: DSP Group Ltd., Herzliya (IL)

(72) Inventors: Dotan Sokolov, Ra'anana (IL); Shlomi Cohen, Herzliya (IL); Venkatesh Gangaiah, Herzliya (IL)

(73) Assignee: DSP Group Ltd.

( * ) Notice: Subject to any disclaimer, the term of this patent is extended or adjusted under 35 U.S.C. 154(b) by 0 days.

(21) Appl. No.: 16/949,804

(22) Filed: Nov. 13, 2020

(65) Prior Publication Data

US 2021/0176811 A1    Jun. 10, 2021

Related U.S. Application Data

(60) Provisional application No. 62/935,089, filed on Nov. 14, 2019.

(51) Int. Cl.
*H04W 76/19* (2018.01)
*H04W 12/04* (2021.01)
*H04W 56/00* (2009.01)
*H04W 12/041* (2021.01)

(52) U.S. Cl.
CPC ........... *H04W 76/19* (2018.02); *H04W 12/04* (2013.01); *H04W 56/001* (2013.01); *H04W 12/041* (2021.01)

(58) Field of Classification Search
CPC .... H04R 1/1025; H04R 5/033; H04R 1/1016; H04R 2420/07; H04R 1/1041; H04R 1/028; H04W 76/10; H04W 84/18; H04W 4/80; H04W 84/12; H04W 52/0225; H04W 52/0245; H04W 52/0229; H05K 999/99; H02J 7/007; H02J 7/0044; H02J 50/10; H02J 7/025; H04M 1/6066; Y02D 30/70; Y02D 70/00

See application file for complete search history.

(56) References Cited

U.S. PATENT DOCUMENTS

| | | | |
|---|---|---|---|
| 8,768,252 B2 | 7/2014 | Watson et al. | |
| 10,158,934 B2* | 12/2018 | Boesen | H04R 1/1041 |
| 10,299,300 B1* | 5/2019 | Young | H04W 76/11 |
| 10,764,699 B1* | 9/2020 | Rule | G10K 11/17885 |
| 10,966,047 B1* | 3/2021 | Tong | H04R 29/006 |
| 2007/0287418 A1* | 12/2007 | Reddy | H04W 12/50 455/410 |
| 2008/0279158 A1* | 11/2008 | Schmidt | H04L 63/0428 380/270 |
| 2012/0058727 A1* | 3/2012 | Cook | H04R 3/12 455/41.3 |
| 2014/0029701 A1* | 1/2014 | Newham | H04J 3/0652 375/340 |
| 2016/0112825 A1* | 4/2016 | Miller | H04W 4/80 455/41.2 |

(Continued)

*Primary Examiner* — Yee F Lam
(74) *Attorney, Agent, or Firm* — Paradice & Li LLP

(57) ABSTRACT

A wireless audio system that may include a first wireless transceiver that is configured to receive audio information from an audio source over a bi-directional wireless link; a second wireless transceiver that is configured to sniff audio information sent over the bi-directional wireless link; and wherein the first and second wireless transceivers are configured to share sniff enabling information, over a shared link and before an establishment of the bi-directional wireless link.

22 Claims, 8 Drawing Sheets

(56) References Cited

U.S. PATENT DOCUMENTS

| | | | |
|---|---|---|---|
| 2017/0064433 A1* | 3/2017 | Hirsch | H05K 999/99 |
| 2017/0093079 A1* | 3/2017 | Wagman | B65D 25/02 |
| 2017/0339482 A1* | 11/2017 | Schrems | G06F 1/1698 |
| 2017/0359717 A1* | 12/2017 | Adler | H04L 9/0891 |
| 2018/0014109 A1* | 1/2018 | Boesen | H04R 1/1025 |
| 2018/0184234 A1* | 6/2018 | Chen | H04W 76/14 |
| 2019/0081499 A1* | 3/2019 | Sun | H02J 7/0047 |
| 2020/0107174 A1* | 4/2020 | Tong | H04R 1/1025 |
| 2020/0137699 A1* | 4/2020 | Girardier | H04W 4/80 |
| 2020/0252993 A1* | 8/2020 | Srivastava | H04W 52/0274 |
| 2020/0296499 A1* | 9/2020 | Chen | H04R 1/10 |
| 2020/0396680 A1* | 12/2020 | Murali | H04W 4/80 |
| 2021/0050960 A1* | 2/2021 | Jang | H04W 28/04 |
| 2021/0076435 A1* | 3/2021 | Cheong | H04W 76/14 |
| 2021/0099002 A1* | 4/2021 | Banerjee | H02J 7/0048 |
| 2021/0203454 A1* | 7/2021 | Cheong | H04L 1/1819 |
| 2021/0211815 A1* | 7/2021 | Fritzsche | H04R 25/556 |
| 2021/0282207 A1* | 9/2021 | Cheong | H04W 72/0446 |
| 2022/0039179 A1* | 2/2022 | Chen | H04M 1/72412 |

* cited by examiner

TRUE WIRELESS STEREO SYSTEM AND METHOD

CROSS REFERENCE

This application claims priority from U.S. Provisional Patent Ser. No. 62/935,089, filed Nov. 14, 2019.

BACKGROUND

True Wireless Stereo (TWS) Technology enables to transmit audio stream from a master device (also referred to as master or audio source) into two or more slave devices (such as wireless transceivers), so that audio is played in synchronization on all slave devices. This technology becomes common on Bluetooth enabled devices such as wireless headphones/earbuds or wireless speakers, in which the headphones, the earbuds and the speakers are not connected.

An inquiring Bluetooth enabled device may perform multiple repetitions of the following steps: (a) sending a signal (known as an inquiry of page) using a unique identifier, and (b) listening to responses in order to locate one or more responding Bluetooth enabled devices. A response of may include the frequency hopping synchronization (FHS) packet of the responding device.

The inquiring Bluetooth enabled device shares its own FHS packet with the one or more responding Bluetooth enabled devices.

The inquiring Bluetooth enabled device may then perform frequency hopping according to the FHS packets exchanged between the Bluetooth enabled devices There is a growing need to perform effective manner for TWS.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
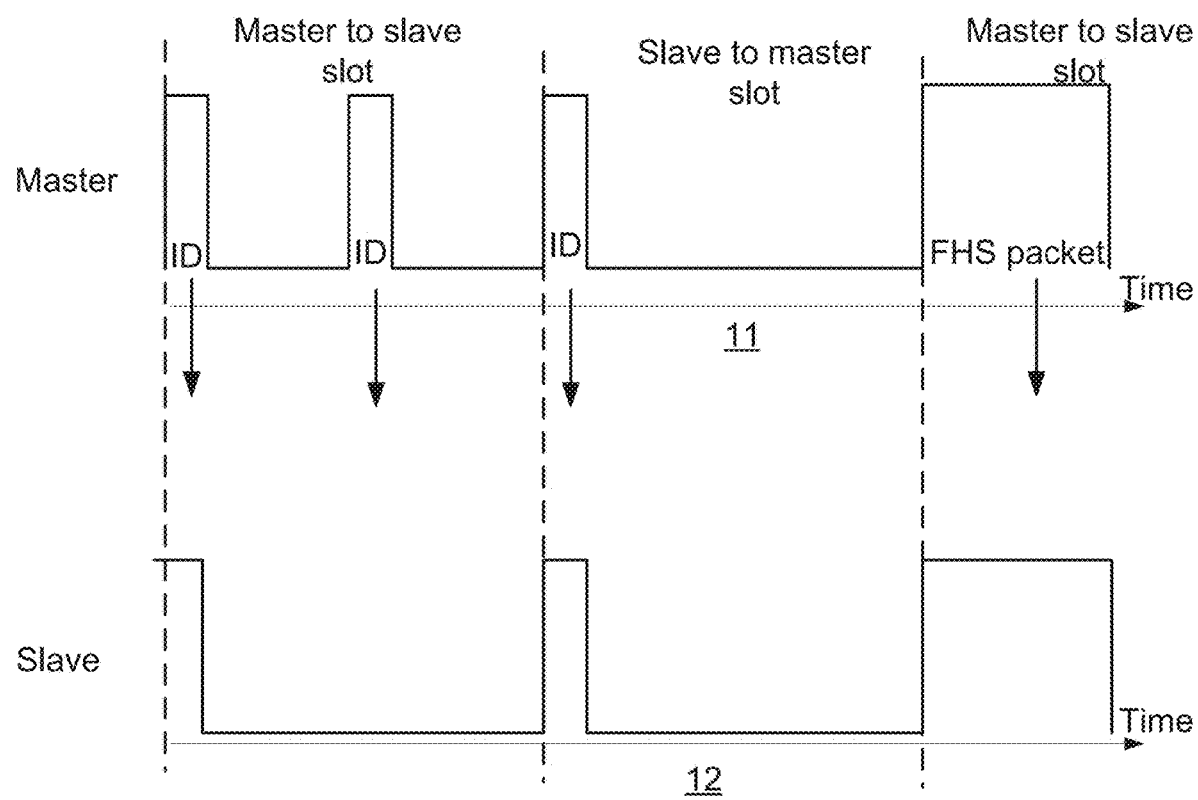
FIG. 1 is an example of a timing diagram.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated at least one embodiment of the present invention may for the most part, be implemented using components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

There may be provide a device, a method, a kit and at least one computer readable medium for TWS.

For simplicity of explanation it is assumed that there are two wireless transceivers and a master device. It should be noted that there may be more than two wireless transceivers that should receive the audio information from the master device—accordingly—there may be one or more additional sniffers.

TWS can be implemented in various ways.

Sniffing involves having a first slave device (such as a first wireless transceiver) communicating over a bi-directional wireless link with the master device. Audio information from the master device is sent over the bi-directional wireless link to the first slave device. The first slave device sends to the second slave device (such as a second wireless transceiver) at least one link parameters that allow the second slave device to receive the audio information that was sent over the first wireless link. In a sense the second slave device established a sniffing communication link (which is uni-directional) with the master device.

U.S. Pat. No. 8,768,252 illustrates sending the link parameters by a first wireless transceiver, to the second wireless transceiver (and over a second wireless link) only after the establishment of the first wireless link with the master device.

The suggested method may involve having the first and second wireless transceivers coupled to each other via a shared link (also referred to as a primary link)—that may be wired or wireless.

The first and second wireless transceivers may use a shared link that is wired while within a storing and charging device and may use a shared link that is wireless while outside the storing and charging device.

The shared link is used for sharing out of at least some of the link parameters (or at least perform preliminary steps such as clock synchronization), before any of the wireless transceivers establishes, the first wireless link with the master device. The at least some of the link parameters are referred to as sniff enabling information.

This schema gives total isolation of the earbuds and allows multiple sniffing device to sniff the link with just few parameters shared between the earbuds.

The master device may transmit the audio over a frequency hopping bi-directional wireless link.

For Bluetooth (BT) sniffing, the frequency hopping sequence of the master device is characterized by information that is located within an FHS packet.

The first and second wireless transceivers (assuming that the second wireless transceiver operates as a sniffer) are clocked synchronized. In order to receive the FHS packet (for example—the accuracy of the clock synchronization may be, for example +/−10 μS).

The sniffer needs to scan in Inquiry/paging hopping sequence and once it find ID message it knows the frequency that the FHS will be received in, as depicted in FIG. 1. This tasks involves one of the critical timing in the Baseband where each slot is 312 μs. Master timing diagram is denoted 11 and slave timing diagram is denoted 12. The master transmits identifiers ID then eventually transmits a FHS packet.

The clock synchronization may be executed while the first and the second wireless transceivers are located in a storage and charging device such as box 40 (for storing and charging the first and second wireless transceivers) and are coupled to each other by a shared link such as wired communication link 32.

The first and second wireless transceivers may use the wired link for communication and clock synchronization.

Figure 2:
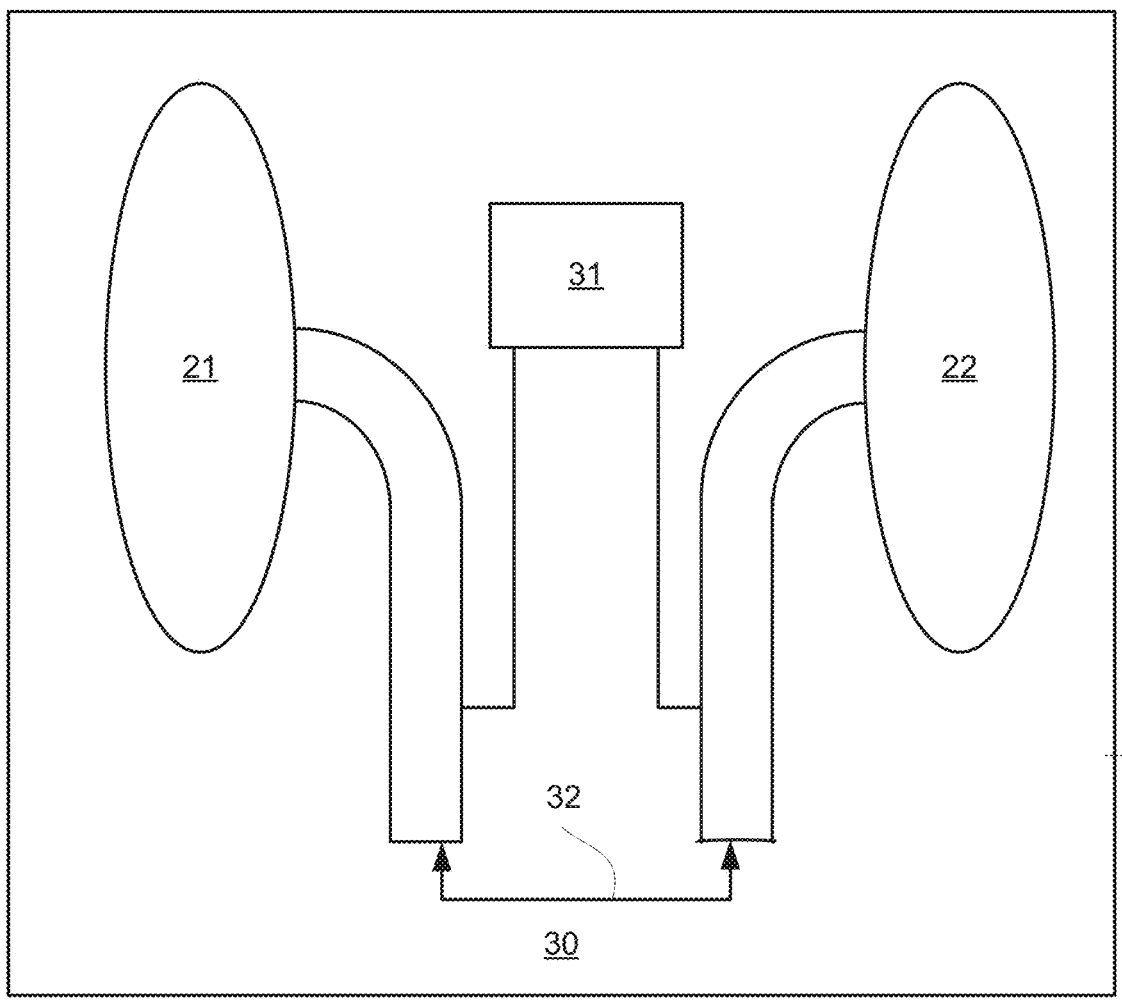
FIG. 2 is an example of first and second wireless transceivers within a box.
Figure 2:
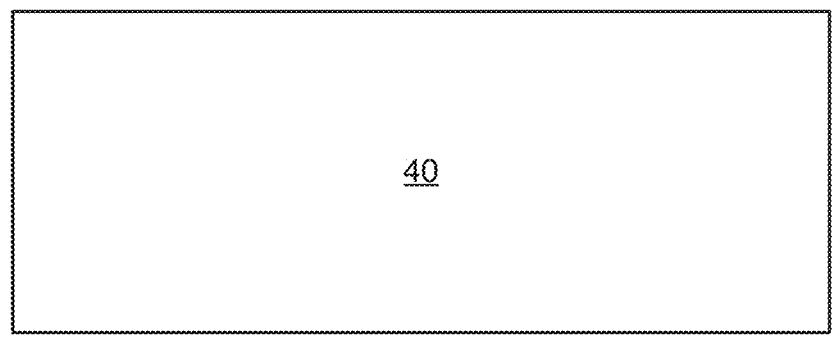

An example of box 40, a master device (denoted audio source 40), first and second wireless transceivers (also referred to as first and second earbuds) 21 and 22 and a shared link that is wired communication link 32 are illustrated in FIG. 2. The figure also illustrates charging unit 31 for charging the first and second wireless transceivers.

The charging unit may not be a part of box 30.

The storage and charging device may differ from a box.

Figure 3:
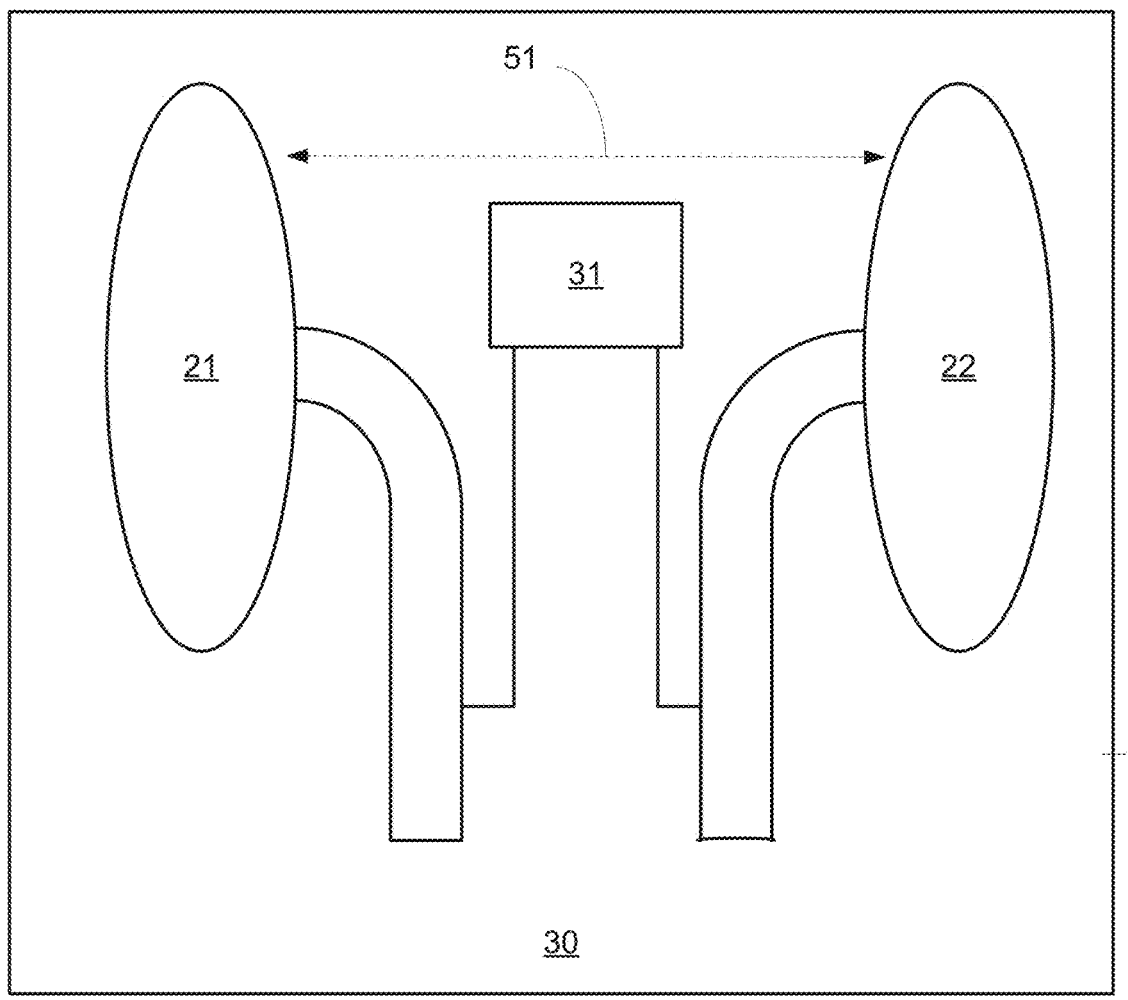
FIG. 3 is an example of first and second wireless transceivers within a box.
Figure 3:
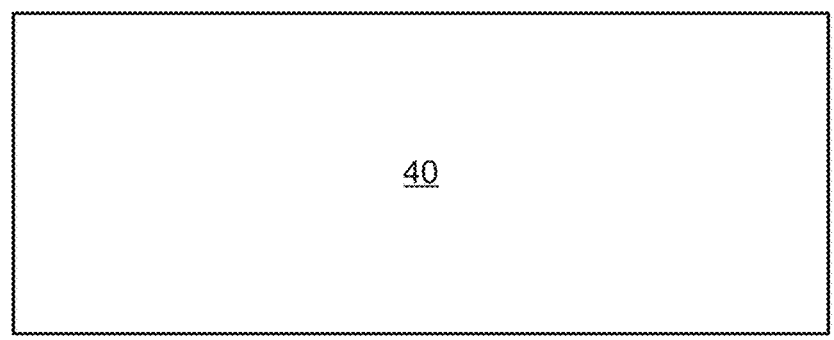

FIG. 3 differs from FIG. 2 by illustrating a shared link that is a wireless link 51 between the first and second wireless transceivers—and that wireless link is established even when both first and second transceivers are in the box.

Figure 4:
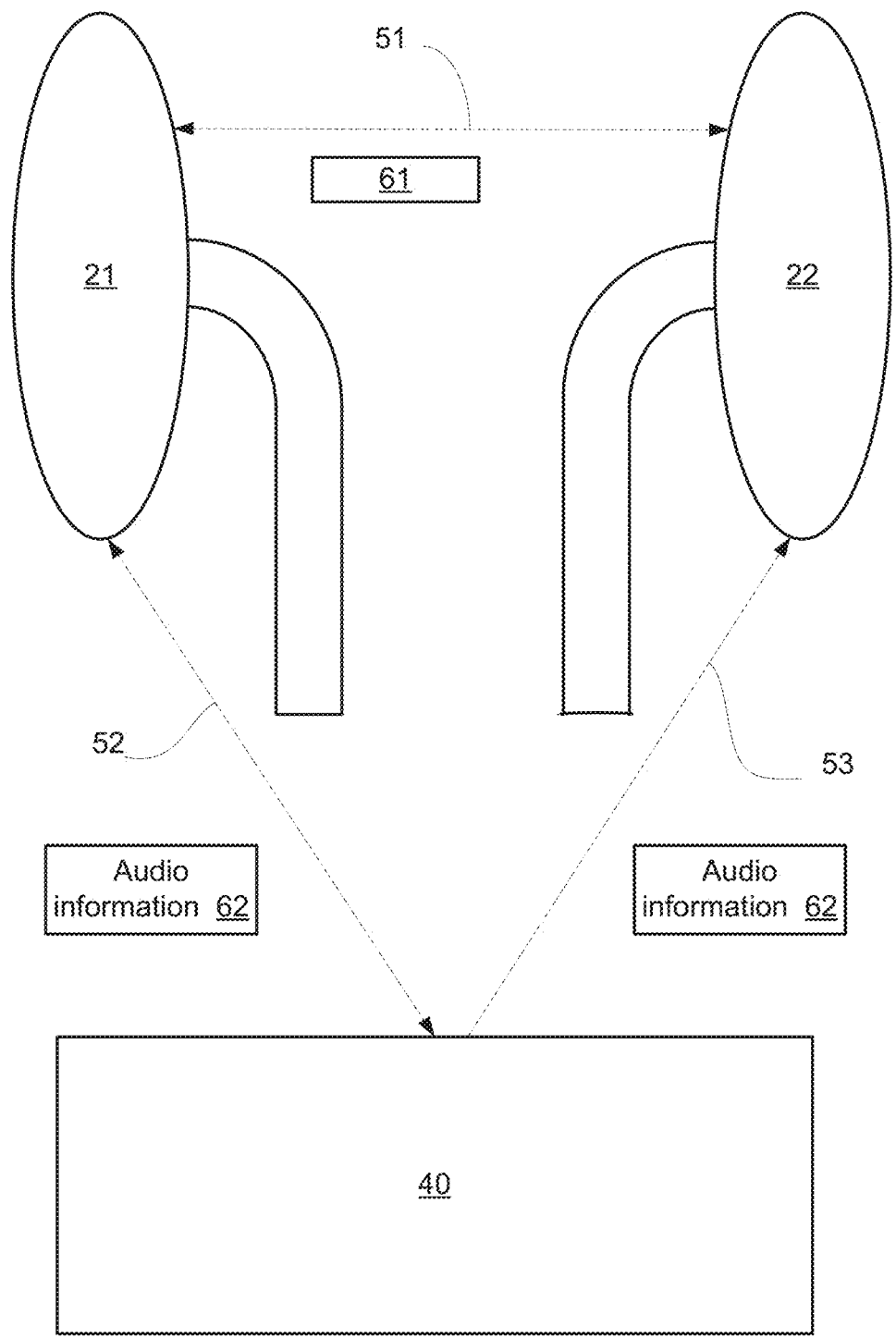
FIG. 4 is an example of an audio source, and the first and second wireless transceivers.

FIG. 4 illustrates the first and second wireless transceivers 21 and 22, the bi-directional wireless communication link 52 between the master device 40 and the first wireless transceiver 21, and a shared link 51 that is a wireless link that was established between the first and second wireless transceivers to share sniff enabling information 61 and/or exchange commands, status, information, clock synchronization information, and the like.

Audio information 62 from the audio source is sent over bi-directional wireless communication link 62 and over a uni-directional sniffing wireless channel 53.

When one of the first and second wireless transceivers is taken out the box (for example the first wireless transceiver), the communication with the second wireless transceiver may stop and the first wireless transceiver may start (immediately or at some delay) to establish the second wireless link with the master device.

The second wireless transceiver may start (immediately or at some delay—for example after being outputted from the box) to attempt to sniff.

The first and second wireless transceivers may detect that they were outputted from the box in various manners—for example when a charging that occurs in the box stops. Yet another detection methods may be applied—for example detecting a wireless connection loss.

Since the sniffer needs to reliably obtain the frequency hopping and timing schema, the first wireless transceiver may query the sniffer for getting the FHS packet of the page response message. In case where the sniffer misses the page response message then the first wireless transceiver may will restart the connection. This will ensure that both earbuds knows the frequency hopping of the master device and can follow the BT link.

Figure 5:
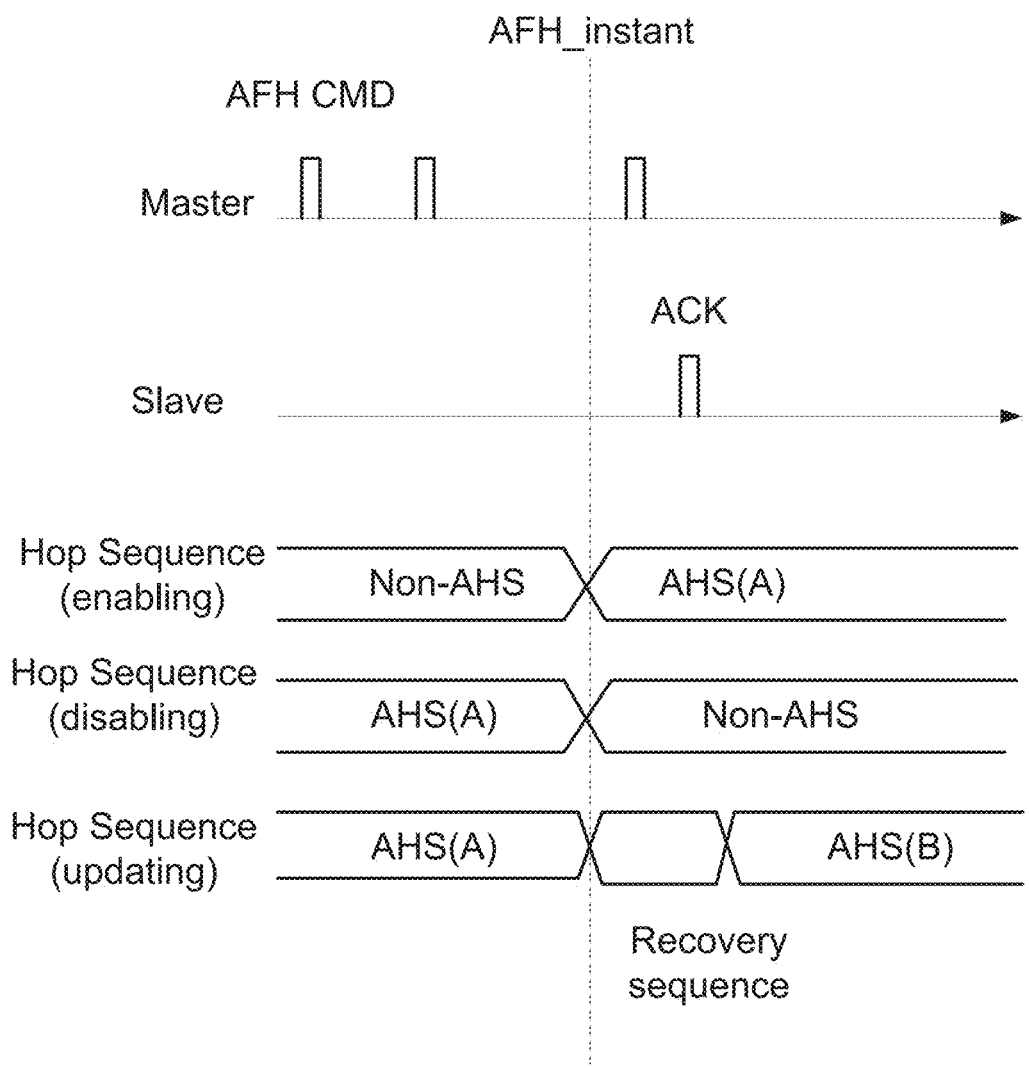
FIG. 5 is an example of a timing diagram.

During connection, while the AFH is active, a FH_channel_map may be sent by the master device to change the frequency hopping schema, in order to adapt to RF environmental changes, and a sniffer should send its acknowledge to the first wireless transceiver, and only when the first wireless transceiver receives acknowledgement from the sniffer (in case of multiple sniffers—from all sniffers) then the first wireless transceiver will acknowledge the AFH command. See, for example, timing diagram 70 of FIG. 5.

To enable the first and second wireless transceivers to do the pairing (with the master device)—both first and second wireless transceivers may share the same public and private keys.

In case of authentication/encryption failure, the BT spec mandate to use different random number. In such case—the first and second wireless transceivers will start the pairing process from scratch.

The first and second wireless transceivers may communicate using wired or wireless link before the establishment of the first wireless link (with the master device).

Non-limiting example of the link parameters that can be sent to the sniffer (even before the establishment of the first wireless link) are listed below:
 a. Hop sequence parameter: the first wireless transceiver may share this characteristic value with the sniffer and the sniffer may calculate the hop sequence in order to follow the hopping sequence.
 b. Random number pair with source: this random number will be used later by the first wireless transceiver to pair with the master device, the first wireless transceiver may share this characteristic value with the second wireless transceiver, such that it can follow the link pairing procedure.

Acknowledgement data: the second wireless transceiver may notify the first wireless transceiver about each ACL packets or common packets [DM1, ID, FHS, AFH] received from the master device as an acknowledgement.

The acknowledgment will allow the first wireless transceiver to ask for retransmission of the missed packet by the second wireless transceiver.

Figure 6:
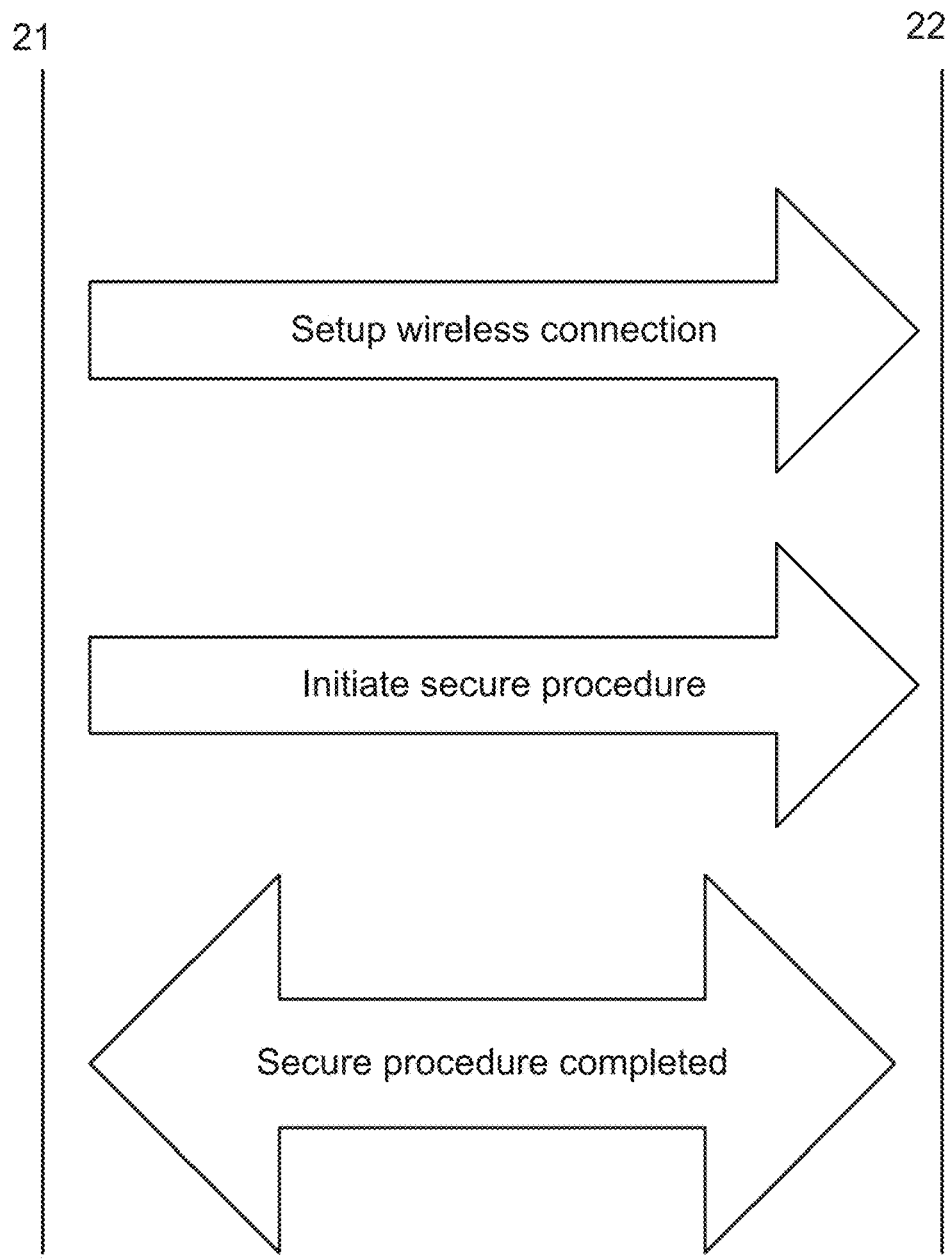
FIG. 6 is an example of a timing diagram.

The first wireless transceiver may need to exchange data with the second wireless transceiver over the second wireless link (such as shared link 51)—that may be a secure connection. Accordingly—the first and second wireless transceivers may pair with each other and generate required security keys. This is illustrated in timing diagram 80 of FIG. 6.

Figure 7:
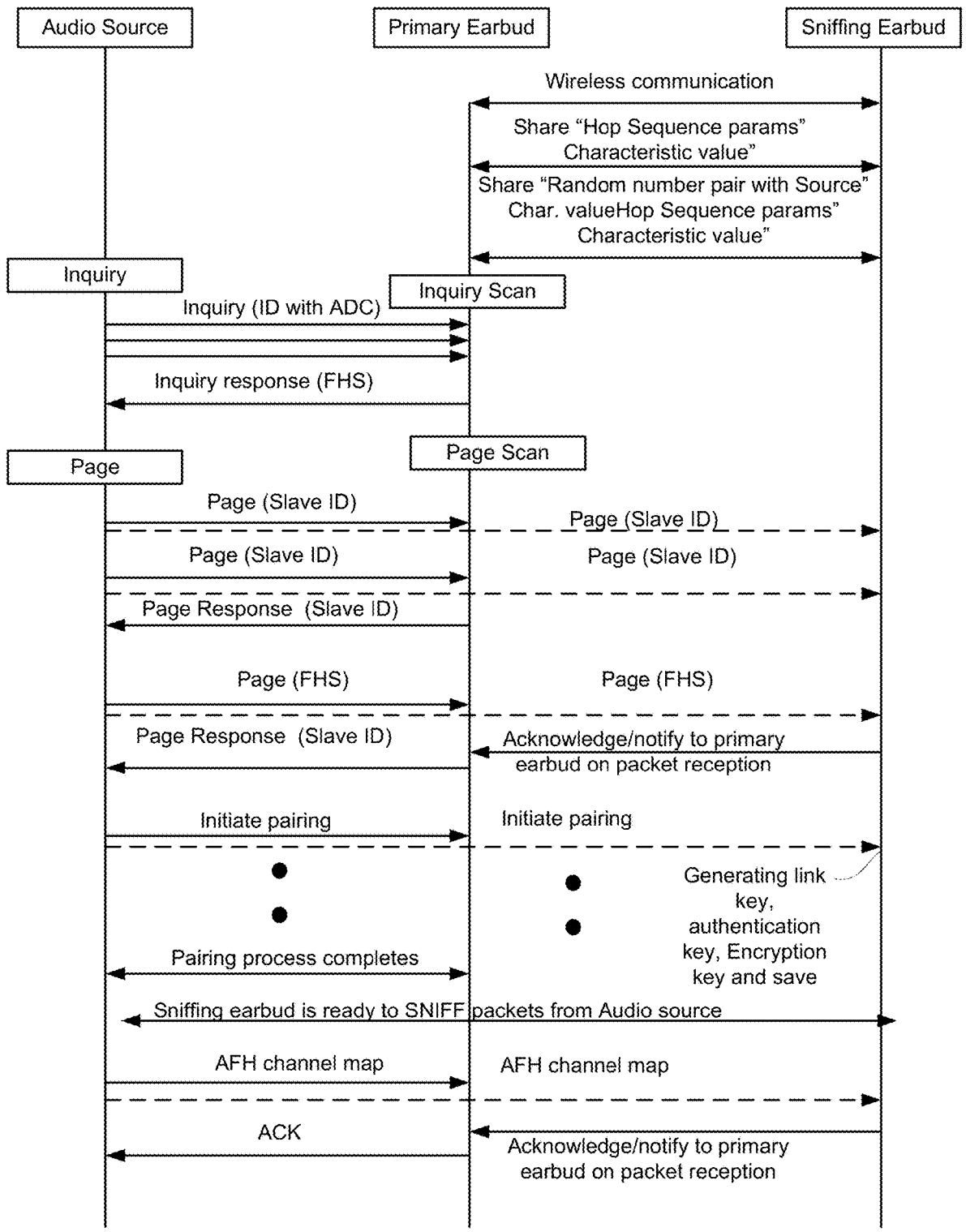
FIG. 7 is an example of a timing diagram.
Figure 8:
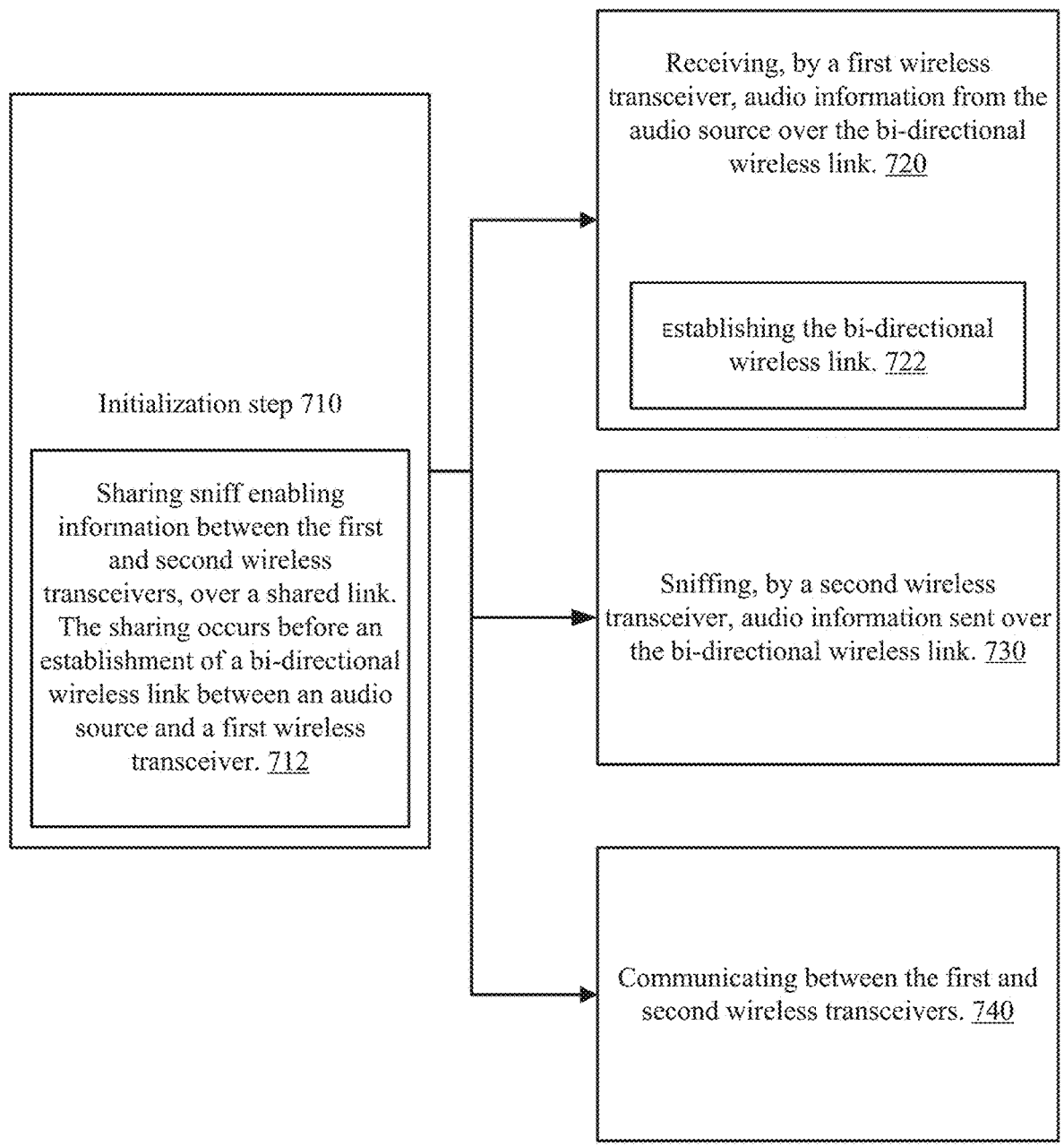
FIG. 8 is an example of a method.

FIG. 7 depicts an example of a communication between the master device and the first wireless transceiver. FIG. 7 also depicts the first wireless transceiver shared required details for the second wireless transceiver in order to allow the latter to sniff Bluetooth packets from the master device.

Table 1 illustrates that for multiple sniffers—a sniffer may use use proprietary small access code with a TDD schema, if the first wireless transceiver can corelate to it, it will regard as acknowledgement.

Each of the sniffed earbuds sends proprietary ACK message after the primary earbud and the all sniffing earbuds complete the reception of the packet.

When joining the sniffing, each earbuds gets identifier for being $1^{st}$ $2^{nd}$ $3^{rd}$ etc. sniffing earbud.

The sniffing earbuds uses this number to know exactly when to transmit the proprietary ACK message, such that they will not collide with each other.

The primary earbud may use majority vote or consensus method to decide if to ACK the master or to NAK and wait for retransmission In table 1:

TABLE 1

| Hop sequence | k | k | k | k | k | k | k | k | k | k+1 |
|---|---|---|---|---|---|---|---|---|---|---|
| | | AC | HD | DH5/2DH5/3DH5 | | | | | | |
| Master | | ⌐——————————————¬ | | | | | | | | |
| Primary earbud | GF RX | | EDR RX | | | | GF RX | | SW ACK | |
| Sniffing earbud1 | | | | | SW | AC | | | | |
| Sniffing earbud2 | | | | | SW | | AC | | | |
| Sniffing earbud3 | | | | | SW | | | AC | | |
| Sniffing earbud4 | | | | | SW | | | | AC | |
| time µSec | 68 | 54 | | 2712 | | | 291 | | | |

AC = Access code
HD = header
SW = Switch from RX to TX + move to GFSK
GF = Move to GFSK FIG. 7 illustrates an example of a method 700.

Method 700 may start by initialization step 710.

The initialization step 710 may include at least one of the following:

a. Sharing sniff enabling information between the first and second wireless transceivers, over a shared link. The sharing occurs before an establishment of a bi-directional wireless link between an audio source and a first wireless transceiver. (Step 712).

b. Sharing the sniff enabling information while the first and second wireless transceivers are being charged.

c. Performing clock synchronization between the first and second wireless transceivers while the first and second wireless transceivers are being charged.

d. Sharing, by the first and second wireless transceivers private and public keys.

e. Sharing of the sniff enabling information while the first and second wireless transceivers are positioned in a storage and charging device.

f. Detecting, by each of the first and second wireless transceivers, an exit from the storage and charging device.

g. Stopping, by the first wireless transceiver, to communicate with the second wireless transceiver, following a detection of an exit of the first wireless transceiver from the storage and charging device.

h. Resuming a communication between the first and second wireless transceivers, following a detection of an exit of each one of the first wireless transceiver and second wireless transceiver from the storage and charging device.

i. Performing clock synchronization between the first and second wireless transceivers while the first and second wireless transceivers are positioned in the storage and charging device.

Step 710 may be followed by steps 720, 730 and 740.

Step 720 may include receiving, by a first wireless transceiver, audio information from the audio source over the bi-directional wireless link.

Step 720 may include establishing the bi-directional wireless link.

Step 730 may include sniffing, by a second wireless transceiver, audio information sent over the bi-directional wireless link.

The shared link may be a wired link or a wireless link.

Method 400 may also include step 740 of communicating between the first and second wireless transceivers. The communication may be executed during the reception of the audio information.

Step 740 may include:

a. Informing, by the first wireless transceiver, the second wireless transceiver about a future change in the sniff enabling information.

b. Determining by the first wireless transceiver, whether the second wireless transceiver received the sniff enabling information.

c. Re-establishing communication with the second wireless transceiver when determining that the second wireless transceiver did not receive the sniff enabling information.

Any of the figures may or may not be in scale.

Any reference to any of the terms "comprise", "comprises", "comprising" "including", "may include" and "includes" may be applied to any of the terms "consists", "consisting", "and consisting essentially of".

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between elements are merely illustrative and that alternative embodiments may merge elements or impose an alternate decomposition of functionality upon various elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single device. Alternatively, the examples may be implemented as any number of separate devices or separate devices interconnected with each other in a suitable manner. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A wireless audio system, comprising:
   a first wireless transceiver configured to receive audio information from an audio source over a bi-directional wireless link; and
   a second wireless transceiver configured to sniff the audio information sent over the bi-directional wireless link, wherein the first and second wireless transceivers are configured to share sniff enabling information over a shared link before the bi-directional wireless link is established, the sniff enabling information including a random number for pairing the first wireless transceiver with the audio source.

2. The system of claim 1, wherein the shared link is a wired link.

3. The system of claim 1, wherein the first and second wireless transceivers are configured to share the sniff enabling information while being charged.

4. The system of claim 1, wherein the first and second wireless transceivers are configured to perform clock synchronization while being charged.

5. The system of claim 1, wherein the first and second wireless transceivers are configured to share private and public keys.

6. The system of claim 1, wherein the first wireless transceiver is configured to inform the second wireless transceiver about a future change in the sniff enabling information.

7. The system of claim 1, wherein the first wireless transceiver is configured to check whether the second wireless transceiver received the sniff enabling information, and to re-establish communication with the second wireless transceiver when determining that the second wireless transceiver did not receive the sniff enabling information.

8. The system of claim 1, wherein the first and second wireless transceivers are configured to share the sniff enabling information while positioned in a storage and charging device.

9. The system of claim 8, wherein each of the first and second wireless transceivers is configured to detect an exit from the storage and charging device.

10. The system of claim 8, wherein the first wireless transceiver is configured to stop communicating with the second wireless transceiver, following a detection of an exit of the first wireless transceiver from the storage and charging device.

11. The system of claim 10, wherein the first and second wireless transceivers are configured to resume communication, following a detection of an exit of each of the first and second wireless transceivers from the storage and charging device.

12. The system of claim 8, wherein the first and second wireless transceivers are configured to perform clock synchronization while positioned in the storage and charging device.

13. The system of claim 1, further comprising:
   at least one additional wireless transceiver, in addition to the second wireless transceiver, that is configured to sniff the audio information sent over the bi-directional wireless link, wherein the first wireless transceiver and each one of the at least one additional wireless transceiver are configured to share the sniff enabling information over at least one shared link, the sniff enabling information being shared before the establishment of the bi-directional wireless link.

14. The system of claim 1, wherein the sniff enabling information further includes a hop sequence parameter.

15. The system of claim 1, wherein the first wireless transceiver is configured to restart the bi-directional wireless link, when finding that the second wireless transceiver missed a page response message sent over the bi-directional wireless link.

16. The system of claim 1, wherein the shared link is a wireless link.

17. A method comprising:
   receiving, by a first wireless transceiver, audio information from an audio source over a bi-directional wireless link;
   sniffing, by a second wireless transceiver, the audio information sent over the bi-directional wireless link; and
   sharing sniff enabling information between the first and second wireless transceivers over a shared link before the bi-directional wireless link is established, the sniff enabling information including a random number for pairing the first wireless transceiver with the audio source.

18. The method of claim 17, wherein the shared link is a wired link.

19. The method of claim 17, wherein sharing the sniff enabling information occurs while the first and second wireless transceivers are being charged.

20. The method of claim 17, wherein the first and second wireless transceivers are configured to perform clock synchronization while being charged.

21. The method of claim 17, further comprising:
sharing, by the first and second wireless transceivers, private and public keys.

22. At least one non-transitory computer readable medium that stores instructions for:
receiving, by a first wireless transceiver, audio information from an audio source over a bi-directional wireless link;
sniffing, by a second wireless transceiver, the audio information sent over the bi-directional wireless link; and
sharing sniff enabling information between the first and second wireless transceivers over a shared link before the bi-directional wireless link is established, the sniff enabling information including a random number for pairing the first wireless transceiver with the audio source.

* * * * *